US 6,555,791 B2

(12) United States Patent
Lubrina et al.

(10) Patent No.: US 6,555,791 B2
(45) Date of Patent: Apr. 29, 2003

(54) OVEN AND AN OVEN CONTROL METHOD (75) Inventors: Yves Lubrina, Poligny (FR); Jean-Pierre Medigue, Poligny (FR)

(73) Assignee: Thirode Grandes Cuisines Poligny, Poligny (FR)

( * ) Notice: Subject to any disclaimer, the term of this patent is extended or adjusted under 35 U.S.C. 154(b) by 0 days.

(21) Appl. No.: 10/014,548

(22) Filed: Dec. 14, 2001

(65) Prior Publication Data
US 2002/0179588 A1 Dec. 5, 2002

(30) Foreign Application Priority Data
Dec. 15, 2000 (FR) .............................. 00 16407

(51) Int. Cl.[7] .............................. A21B 1/26; A21B 1/40
(52) U.S. Cl. ....................... 219/400; 219/401; 126/21 A
(58) Field of Search ................. 219/400, 401, 219/492, 494; 126/21 A (56) References Cited

U.S. PATENT DOCUMENTS

| 3,936,659 | A | * | 2/1976 | Mainord | 219/400 |
|---|---|---|---|---|---|
| 4,350,860 | A | * | 9/1982 | Ueda | 219/492 |
| 4,672,180 | A | * | 6/1987 | Kusunoki et al. | 219/494 |
| 4,698,487 | A | * | 10/1987 | Meister | 219/401 |
| 4,701,334 | A | * | 10/1987 | Durth | 219/401 |
| 4,800,806 | A | * | 1/1989 | Durth | 219/401 |
| 5,134,927 | A | * | 8/1992 | McCarthy, III et al. | 126/21 A |
| 5,360,966 | A | * | 11/1994 | Noda et al. | 219/494 |
| 5,525,782 | A | * | 6/1996 | Yoneno et al. | 219/401 |
| 5,616,264 | A | * | 4/1997 | Nishi et al. | 219/494 |
| 6,158,329 | A | * | 12/2000 | Schneider et al. | 219/400 |
| 6,318,246 | B2 | * | 11/2001 | Fukushima et al. | 219/401 |

FOREIGN PATENT DOCUMENTS

| DE | 3821205 | 12/1989 |
|---|---|---|
| EP | 0 694 260 | 1/1996 |
| EP | 0 731 319 | 9/1996 |
| EP | 0 959 305 | 11/1999 |
| WO | 99/33347 | 7/1999 |

* cited by examiner

Primary Examiner—Joseph Pelham
(74) Attorney, Agent, or Firm—Young & Thompson

(57) ABSTRACT

An oven includes an enclosure defining an interior space, means for heating the interior space, means for controlling the heating means, and means for cooling the interior space from a particular first temperature to a particular second temperature lower than the first temperature.

23 Claims, 5 Drawing Sheets

FIG_1

FIG_2

FIG_3

FIG_4

FIG_5

OVEN AND AN OVEN CONTROL METHOD

BACKGROUND OF THE INVENTION

1. Field of the Invention

The present invention relates to ovens, especially for cooking, of the individual type, for example for the home, of the collective type, for example for a school or company canteen, or of the industrial type, for preparing cooked dishes in the agrofoodstuffs field.

2. Description of the Prior Art

Because of the great changes in appearance and taste that they can suffer, cooking some foods raises difficult problems of adjusting the temperature and controlling cooking. Red meat, such as roast beef, is one of the most difficult foods to cook. The user or the consumer may require the meat to be cooked rare, medium rare or well done. The core temperature difference of the beef for these three types of cooking is of the order of 1 to 2° C.

"Conventional" dry cooking and steaming at a high temperature very much higher than the required core temperature within the product are known in the art. Adjusting the oven is a simple matter: a temperature and a time are decided on. A temperature probe stuck into the beef can help to determine when it is cooked. The cooking time is short. The beef has the required external appearance, with a center that is more or less red or pink and a lightly browned outer crust. It can be sliced and served directly, with no subsequent operation.

However, it is very difficult to control the degree of cooking correctly. The high temperature difference between the middle of the beef and its surface generates a high inertia, which must be estimated accurately in order to remove the beef from the oven before the target core temperature is reached and allow it to "rest" outside the oven, in the hope that the thermal inertia will enable it to reach approximately the required core temperature, and then carve it at the proper time. There may be significant shrinkage through loss of weight. The tenderness and the juiciness of the beef are not optimum, as the joint can harden and lose juice during carving. Two different size joints of beef cannot be cooked to the same degree and must therefore be removed from the oven several minutes apart, which is particularly bothersome in the context of a collective kitchen. Also, a joint of beef of average quality will also have an average quality appearance and taste after cooking.

The resting time outside the oven after cooking and during which the temperature becomes more uniform is hardly satisfactory from the sanitary point of view, the beef being exposed to dirt and to external pollution, and the meat may be allowed to rest for too long. Cooking at high temperatures often causes significant splashing of grease onto the walls of the oven. The splashes are carbonized because of the high temperature and the dry atmosphere. Thorough and therefore time-consuming and labor-intensive cleaning is necessary to keep the oven clean. Furthermore, a person must remain nearby during the cooking phases to control and monitor the cooking process. Thus the oven can be used only when staff are present. Energy is consumed shortly before the meal, i.e. in the middle of the day, at a time when electrical energy costs are high.

Cooking in steam at a temperature only slightly greater (by 2 to 3° C.) than the required core temperature is also known in the art. This ensures accurate control of the degree of cooking. The end of cooking time does not need to be particularly precise, given that the temperature inside the oven is substantially equal to the required core temperature. It is therefore not necessary to provide any resting time on removing the beef from the oven. Its appearance after carving is properly controlled. The gustatory, tenderness and juiciness aspects are very well preserved regardless of the size of the joint of beef and the load in the oven, i.e. the number of joints of beef cooked at the same time. Bacteria in the meat are thoroughly destroyed because of the long cooking time. The loss of weight of the beef is greatly reduced.

However, cooking takes several hours, which immobilizes an oven for longer. The beef does not have the browned external appearance that the consumer may require. It may therefore be subjected to subsequent treatment with browning agents, sauces, etc. This type of cooking does not necessitate sophisticated resources, except for very accurate temperature regulation. A bain-marie whose water temperature is closely regulated can be used for this type of cooking, for example.

The present invention seeks to combine the advantages of the two types of cooking described hereinabove and to avoid their drawbacks.

The present invention proposes an oven equally suitable for fast cooking and for slow cooking, which can be effected overnight and in the absence of staff.

SUMMARY OF THE INVENTION

The oven according to the invention includes an enclosure defining an interior space, means for heating the interior space, means for controlling the heating means, and means for cooling the interior space from a particular first temperature to a particular second temperature lower than the first temperature.

This means that successive cooking phases can be carried out at precisely defined temperatures to obtain roast beef having a browned external appearance thanks to a first phase conducted at a high temperature, followed by a cooling phase to cool the outside areas of the beef and prevent them transmitting excessive heat to the core of the meat, and a temperature maintenance phase during which the temperature of the various areas of the product becomes more uniform, the degree of cooking then being determined not by the duration of the temperature maintenance phase but only by the temperature.

In one embodiment of the invention the cooling means are controlled by the control means.

The cooling means advantageously include means for evacuating hot air contained in the interior space and means for introducing cold air into the interior space.

More particularly, the cooling means can include an air pump and a valve disposed between the pump and the interior space in the direction of flow of the air, closed when the pump is stopped and open when the pump is operating. The valve prevents unwanted circulation of air during the cooling phase. The pump can be a centrifugal pump.

In one embodiment of the invention the cooling means include means for injecting water. Thus the temperature of the heating means, for example electrical heating elements, can be reduced very quickly by the high calorific capacity of the water. It is therefore particularly beneficial to spray water onto an electrical heating element. Water can be sprayed by means of a fan and can also be directed toward the walls of the interior space, which have some thermal inertia because of their thickness and the insulating materials with which they are surrounded.

The method of controlling an oven according to one aspect of the invention initiates a step of forced cooling of the interior space of an oven initially at a first temperature. Cooling is continued to a second temperature lower than the first temperature.

Cooling air is advantageously drawn in from an external environment, for example the surrounding air. The second temperature is higher than the ambient temperature around the oven.

The method advantageously includes a first step of heating the interior space to a first temperature, a second step of forced cooling to a second temperature, and a third step of maintaining the second temperature.

Furthermore the method can include a fourth step of forced cooling to a third temperature lower than the second temperature and a fifth step of maintaining the third temperature. Other similar steps toward increasingly lower temperatures can be used.

The humidity in the interior space is preferably estimated and controlled.

In one embodiment of the invention the forced cooling step includes spraying water inside the oven, which is particularly effective if the temperature in the interior space is greater than 100° C., and circulation of air with entry of cold air and exit of hot air, which is more efficient for temperatures less than 100° C.

The invention also proposes a method of controlling an oven in which means for heating the interior space of the oven are adapted to operate at a number n of non-zero heating powers. A temperature $T_e$ of the interior space is measured and if $T_e<T_c-BP1$, where $T_c$ is a set point temperature and BP1 is a temperature range, then the heating power P is adjusted to the maximum power $P_{max}$. If the temperature $T_e$ is in the range from $T_c-BP_i$ to $T_c-BP_{i+1}$ where i is in the range from 1 to n, then P is equal to $j/n \times P_{max}$. If the temperature $T_e$ is higher than the set point temperature then P=0 and $BP_i=\alpha_i \times p+\beta_i$, where p is the temperature rise slope in degrees/second, $\alpha$ is a constant expressed in seconds, and $\beta$ is a constant expressed in degrees. If the temperature $T_e$ crosses the value $T_c-BP_i$ on increasing and if the slope p becomes negative, the power P is increased by $1/n \times P_{max}$. If $T_e>T_c+1°$ C., then the power P is decremented by $1/n\ P_{max}$, if not j=n−i.

In one embodiment of the invention $2 \leq n \leq 5$. For example, n=3.

In one embodiment of the invention $\alpha_i=1/(n+1)$, in other words $BP_i=p/(n+1)+\beta_i$.

In one embodiment of the invention $BP_1=p/4+10°$ C. and $BP_2=p/4+2°$ C.

The slope is advantageously calculated for each 0.5° C. variation in temperature. Thus $p=0.5/\Delta t_1$, $\Delta t_1$ being the time period during which the temperature varies by 0.5° C. If $\Delta t_1$ is less than 3 seconds, then p is calculated for a temperature variation of 1° C. with $P=1/\Delta t_2$, $\Delta t_2$ being the time period during which the temperature varies by 1° C. If $\Delta t_2$ is less than 3 seconds, then p is equal to $2/\Delta t_3$, $\Delta t_3$ being the time period during which the temperature varies by 2° C. If $\Delta t_3$ is less than 3 seconds, then p is equal to $4/\Delta t_4$ where $\Delta t_4$ is the time period during which the temperature varies by 4° C.Q. In this way it is possible to avoid reacting to transient phenomena causing erroneous commands to be sent to the oven.

The principle of cooking by temperature phases of particular duration enables the chaining of browning, core cooking and, where applicable, maintenance phases with complete control of all parameters for obtaining optimum quality and achieving the advantages of slow cooking in a short time. The first phase of cooking at high temperature forms a crust that limits loss of weight and has the usual appearance of roast beef. Cooling prevents the exterior areas of the beef transmitting excessive heat to the core area. The temperature maintenance phase determines the core cooking temperature extremely precisely. The product can remain in the temperature maintenance phase for a widely varying time, given a temperature equivalent to the required core temperature and the absence of harmful effects of heat transfer between a hotter area and a cooler area and the absence of the resting time necessary for obtaining more uniform temperatures. The tenderness and the juiciness are optimum. The gustatory aspects are preserved, independently of the size of the product and the load of the oven. The pasteurizing effect is high, which guarantees satisfactory destruction of bacteria. Soiling of the oven is reduced and the low-temperature steam cooking phase prevents the carbonization of splashes and their adherence to the walls of the oven. This reduces the weight loss of the product to be cooked and reduces the time and therefore the cost of cleaning the oven after cooking.

An overnight cooking program can also be provided. The products are set to cook in the evening before the staff go home and are taken out of the oven on the next day when they are to be served. The electrical power consumed by the oven is then charged at the overnight rate, which is generally cheap. The oven is used in masked time, when no staff are present, which facilitates organizing a short shift. The oven is operated outside the working hours of the staff for better amortization. The products can be taken out of the oven as soon as staff arrive in the morning. The oven is then available for cooking other products.

The present invention will be better understood and other advantages will become apparent on reading the detailed description of a few embodiments provided by way of non-limiting example and shown in the accompanying drawings.

DETAILED DESCRIPTION OF THE PREFERRED EMBODIMENT

Figure 1:
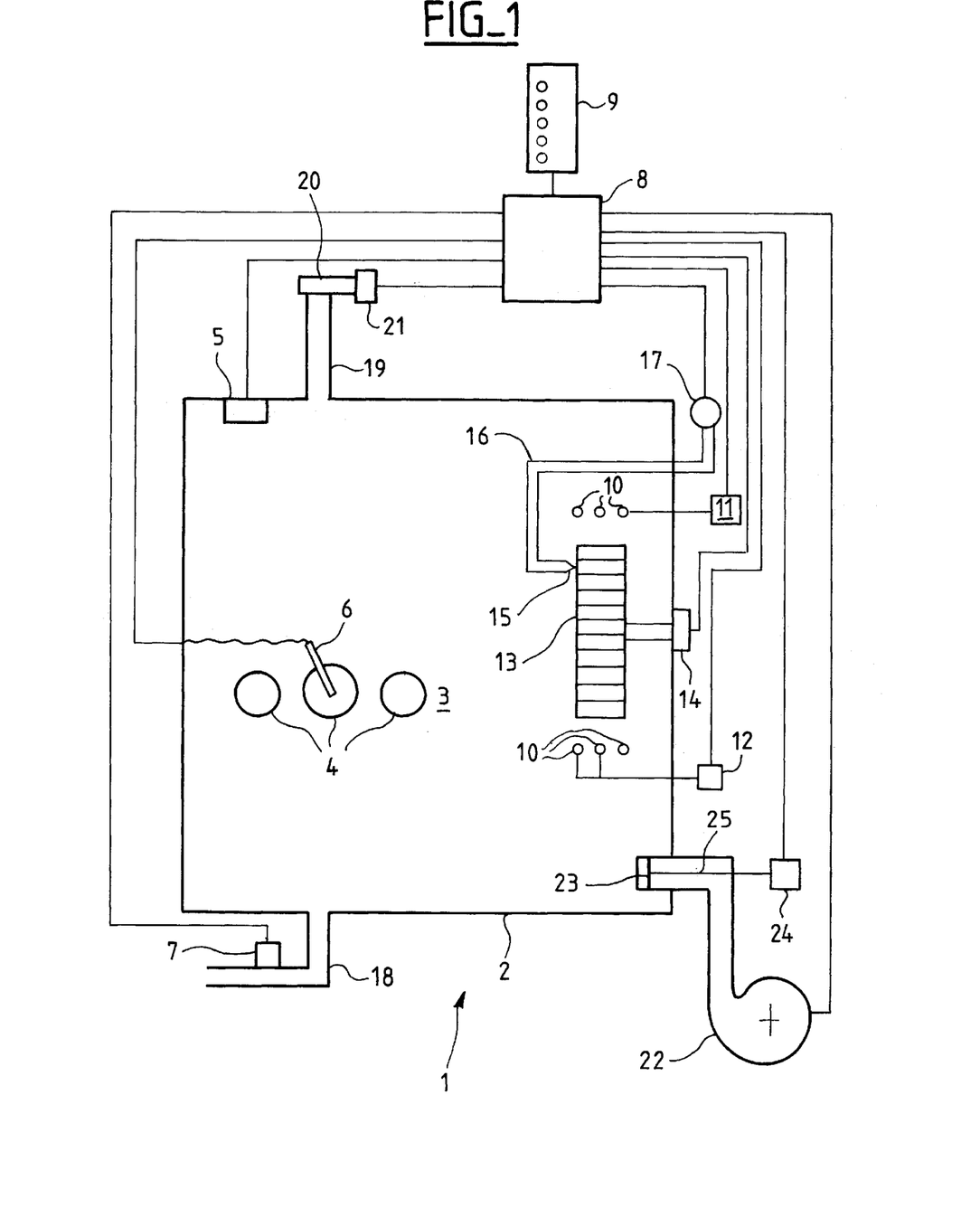
FIG. 1 is a diagrammatic view of an oven in accordance with one aspect of the invention.

As can be seen in FIG. 1, the oven 1 includes an enclosure 2 defining an interior space 3. The enclosure 2 has a door, not shown, and is thermally insulated with an exterior wall, an interior wall and an insulative material disposed between the exterior wall and the interior wall. This is known in the art. For ease of cleaning and good hygiene, the exterior and interior walls can be made from stainless steel. Grids, not shown, for dishes or products to be cooked can be disposed in the interior space 3. Different size joints 4 of beef are shown here.

The oven 1 includes a sensor 5 for measuring the temperature $T_e$ of the interior space 3, a sensor 6 for measuring the temperature $T_p$ at the core of the products 4 to be cooked, taking the form of a probe that can be stuck into the products 4, and a sensor 7 for measuring the temperature $T_l$ of the liquid that condenses in the interior space 3.

The sensors 5, 6 and 7 are connected, for example by wires, to a computer 8 adapted to interpret the data received. The computer 8 includes a microprocessor, one or more memories, a communication bus between the microprocessor and the memory or memories and one or more programs stored in the memory or memories that can be executed by the microprocessor. The central unit 8 is associated with a control panel 9 for displaying information, for example the temperature $T_e$ of the interior space 3 measured by the sensor 5, and control knobs that are described in more detail with reference to FIG. 5.

The oven 1 further includes a plurality of generally circular heating elements 10 (here three such elements), one of which is controlled via an interface 11, for example an electromechanical relay, and the other two of which are controlled via an interface 12 that can be of the same kind. The interfaces 11 and 12 are connected to the computer 8. A centrifugal fan 13 is disposed in the circular space between the elements 10 and is driven by a motor 14 also connected to and controlled by the computer 8.

A nozzle 15 disposed near the fan 13 is connected to a pipe 16 to which is fitted a solenoid valve 17 connected to and controlled by the computer 8. Opening the solenoid valve 17 enables water to be sprayed via the nozzle 15 onto the blades of the fan 13. Thus when the fan 13 is rotating water is sprayed onto the elements 10 and is converted into steam, which increases the humidity in the interior space 3.

Variations of the temperature inside the oven 1 can cause condensation, for example during progressive cooling of the oven starting from a state close to steam saturation. Condensates then form on the walls of the oven and flow downward via a pipe 18 on which is mounted the sensor 7 for measuring the temperature of the condensates.

The oven 1 further includes an evacuation chimney 19 in an upper part of the enclosure 2 and equipped with a valve 20 that can be moved by an actuator 21, for example an electric motor, connected to the computer 8. The valve 20 can be closed, which prevents circulation of air between the interior space 3 and the surrounding atmosphere, or open. The oven 1 includes a fan 22, for example a centrifugal fan, driven by an electric motor, not shown, and whose outlet discharges into the interior space 3 and can be shut off by a valve 23 controlled by an actuator 24, for example an electric motor, via a rod 25. The actuator 24 is connected to the computer 8.

The elements 10 increase the temperature of the interior space 3. The heating power can be adjusted to ⅓ the maximum power by energizing only one of the elements 10 via the interface 11, to ⅔ of the maximum power via the interface 12, and to the maximum power via both interfaces 11 and 12. The fan 13 circulates air in the interior space 3 and distributes the heat produced by the elements 10. In association with the water sprayer means, the fan 13 also increases the humidity in the interior space 3 by distributing water over the element 10, which causes the water to evaporate immediately. The pipe 18 removes the condensate. The means for introducing cold air formed by the fan 22 and the associated components and the means for evacuating hot air formed by the valve 20 and the associated components can cool the interior space 3 rapidly by introducing a large volume of cold air and evacuating a corresponding quantity of hot air, for example at a flowrate of the order of several tens of m³/h. Also, if the interior of the oven is at a high temperature, for example greater than 100°, spraying water via the nozzle 15 cools the elements 10 very quickly, their power supply having been disconnected, and also cools the interior walls of the enclosure 2, which can be at very high temperatures. In this case, some of the water sprayed via the nozzle 15 evaporates and escapes via the pipe 19 and the valve 20, whereas other water condenses and is evacuated via the evacuation pipe 18.

Figure 2:
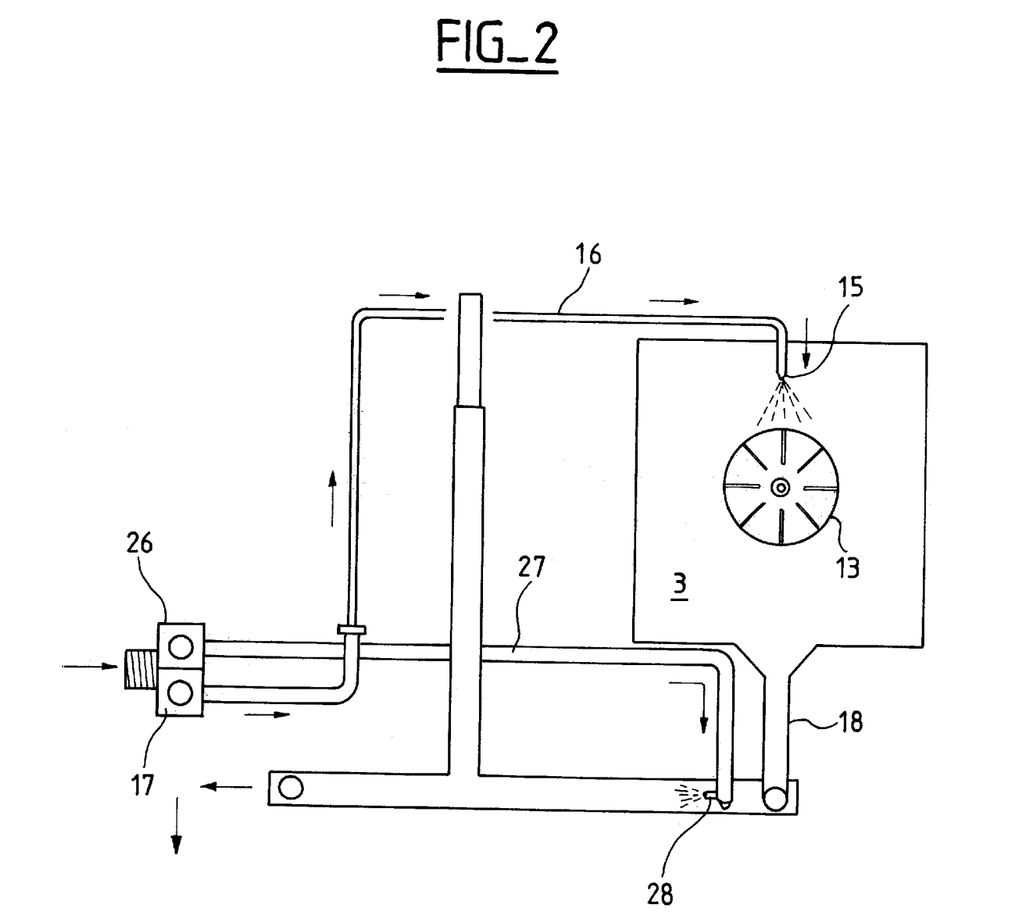
FIG. 2 is a diagrammatic view of a detail from FIG. 1.

FIG. 2 shows a variant in which another solenoid valve 26 is mounted alongside the solenoid valve 17 on a water feed pipe. The solenoid valve 26 is connected to a pipe 27 feeding a nozzle 28 disposed in the pipe 18 for evacuating condensates. This means that, if the valves 20 and 23 are closed and a large quantity of steam is present in the interior space 3, the water in the pipe 18 can be sprayed, which guarantees good condensation of steam liable to escape via the pipe 18. The sensor 7 is not shown in FIG. 2.

Figure 3:
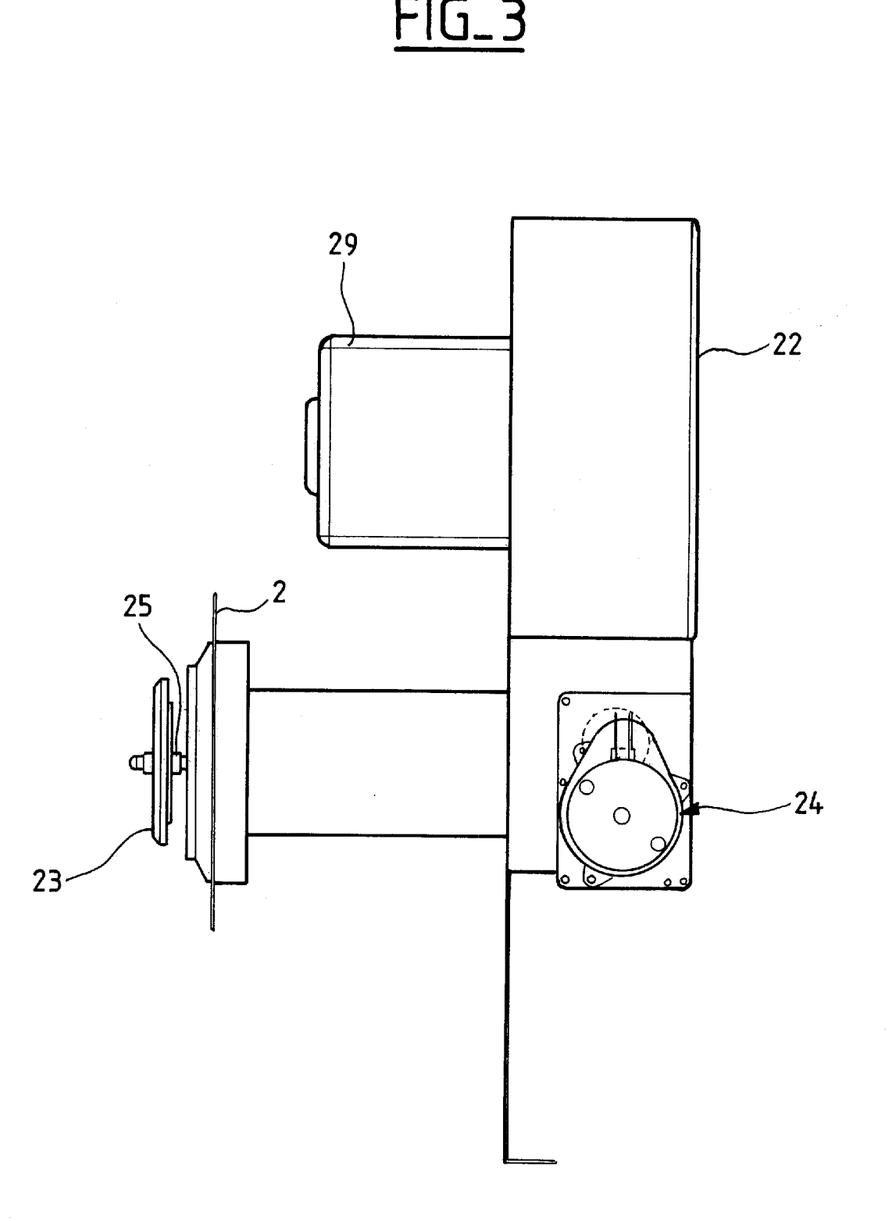
FIG. 3 is a view of a detail of the cold air introduction means.
Figure 4:
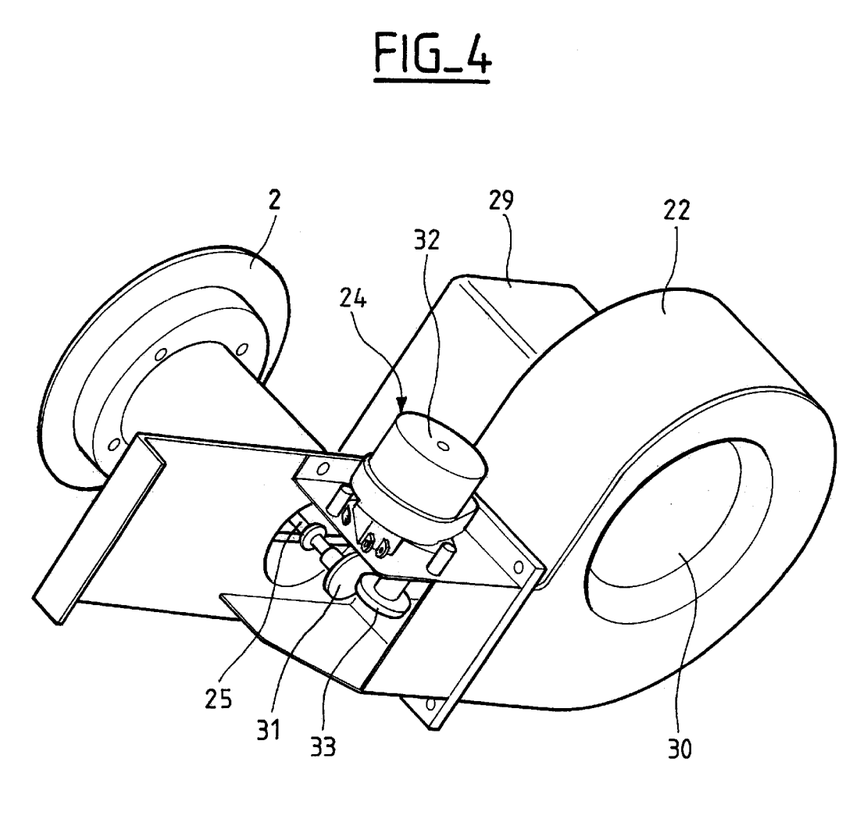
FIG. 4 is a perspective view of the detail shown in FIG. 3.

FIGS. 3 and 4 show in more detail the means for introducing cold air. The rotation of the fan 22 is driven by an electric motor 29 and the fan has an air inlet 30. FIG. 4 is partly exploded to show more clearly the rod 25, which has a bearing surface 31 at the end opposite the valve 23. The actuator 24 includes an electric motor 32 for driving rotation of a cam 33 in contact with the bearing surface 31. A spring, not shown, associated with the rod 25 presses the bearing surface 31 into contact with the cam 33. The motor 32 can be a stepper motor. In a first position the valve 23 is open (see FIG. 3). In another position the cam 33 has rotated through an angle of 180° and the bearing surface 31 has moved away from the enclosure 2, entraining the rod 25 and the valve 23, which have therefore moved toward the enclosure 2 in a closed position.

Figure 5:
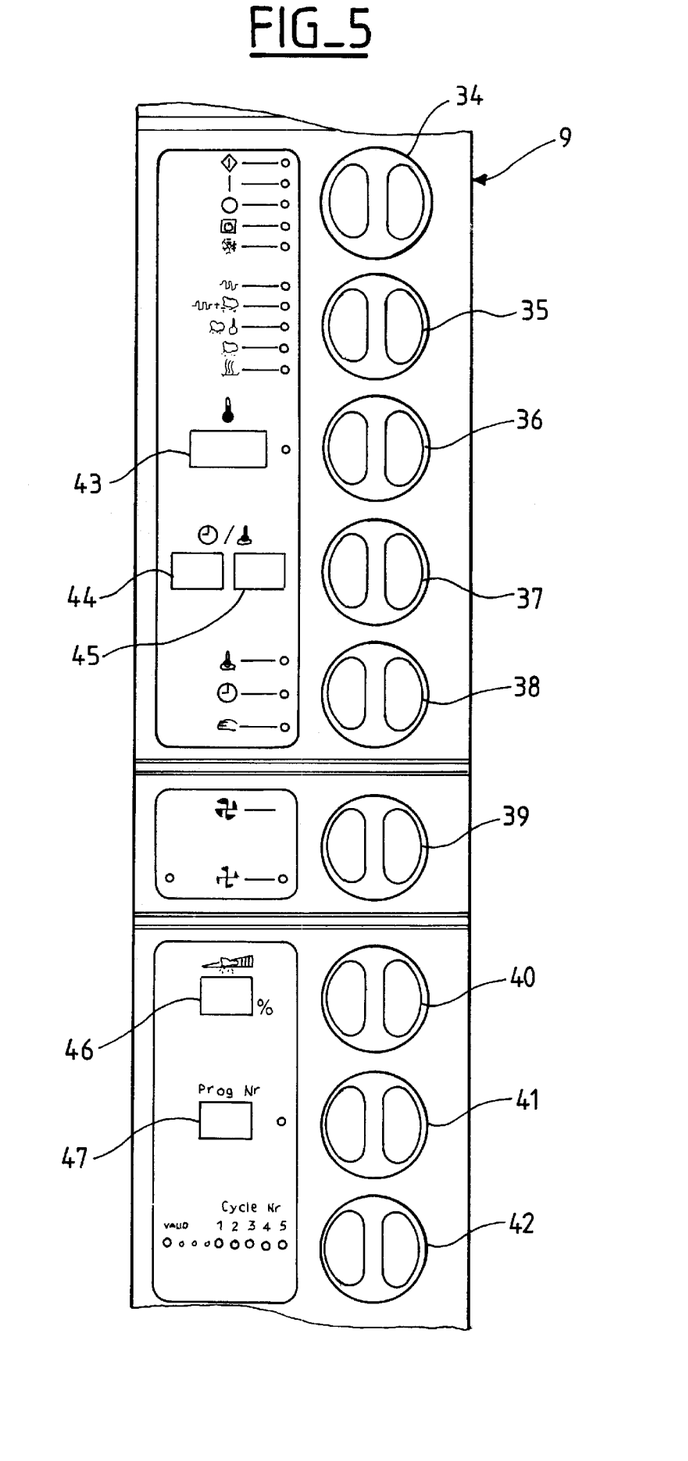
FIG. 5 is a view of the control panel of the oven.

FIG. 5 shows in more detail one embodiment of the control panel 9 provided with knobs 34 to 42. The knob 34 has an off position, an on position, a cooling position and an automatic cleaning position. The knob 35 is for selecting the operating mode, for example dry cooking with pulsed air from 0 to 250° C., mixed cooking with pulsed air and steam from 30 to 210° C., cooking with superheated steam at 105° C., steam cooking from 30 to 98° C. and warm-up. The knob 36 is for adjusting the set point temperature $T_c$. A nearby display 43 displays the measured temperature $T_e$. The knob 37 is for adjusting the cooking time or the core temperature. A nearby display 44 shows the cooking time and a nearby display 45 shows the core temperature.

The knob 38 is for selecting the end of cooking mode, with the end of cooking determined by the core temperature sensor 6, a timer or manually. The knob 39 is for adjusting the rotation speed of the fan 13. The knob 40 is for adjusting the humidity in the interior space 3. A nearby display 46 shows the humidity. The humidity can be measured by a sensor that is not shown in FIG. 1. The knob 41 is for selecting a cooking program number, with the selected number displayed on a nearby display 47. The knob 48 is for choosing a cycle number, a cycle being a portion of a program.

Thus cycles and programs can be programmed using the control knobs. Of course, programs can be loaded into the memory of the computer 8 in the factory and not modified thereafter. However, it is beneficial to enable the user to create new programs in accordance with his requirements or to modify preloaded programs. The oven 1 is therefore provided with means for fine adjustment of the cooking mode. For example, reducing the speed of the fan avoids drying out of products such as rice or pastry while the oven temperature is changing.

In everyday use, a user begins by turning the knob 34 to switch on the oven, turning the knob 41 to choose a preheating program, and turning the knob 34 to start heating. Then, after loading the products to be cooked into the oven, the user turns the knob 41 to choose a cooking program and turns the knob 34 to start cooking.

Dry cooking is used in particular for cakes and pastries that must be dry when fully cooked. Combined cooking is used for roasting, cakes that must be moist when fully cooked, shellfish and fish. The superheated steam position represents a time saving of 10 to 20% compared to the steaming mode, for delicate products such as potatoes, shellfish, frozen green vegetables. Steam cooking is used for defrosting, cooking vegetables and fish, low-temperature cooking and cooking vacuum-packed products. A plate regeneration setting reheats plates and trays of food without drying them out. The set point temperature can be modified in the range from 100 to 140° in general. A plate warming cycle limiting condensation thereon can be provided.

To be more precise, there is provision for the display 43 to indicate the set point temperature $T_c$ without turning the knob 36. Turning this knob shows the actual temperature of the oven. The display is lit when the oven is heating up and off when the set point temperature $T_c$ is reached.

Tests have been carried out on three joints of beef cooked in the standard way and in an oven according to the invention. The results of the tests are shown in the hereafter disposed table.

It is therefore clear that the invention controls cooking much better, as much in terms of core temperature as of product appearance. In the test carried out in the standard oven, the lightest joint C was entirely gray and had therefore been overcooked. In contrast, in the test carried out in the oven according to the invention, the joints A, B and C had the usual browned crust, a thin gray area, of the order of 5 mm thick, and a core area of red color over the remainder of the joint, as appreciated by customers. It is thus possible to cook joints of beef of very different weights, in the same way, with the same temperatures and the same times, which represents a great saving in labor necessitated by supervising cooking in a standard oven.

What is more, weight losses were reduced by the order of 30 to 40%, which represents an important saving.

| COOKING IN THE OVEN 1 | | COOKING IN STANDARD OVEN | |
|---|---|---|---|
| Load:-3 joints of beef (A; B; C) | | Load:-3 joints of beef (A; B; C) | |
| Cooking principle: (5 phases) | | Cooking principle: (1 phase) | |
| Dry mode 230° C. 20 min Cooling mode 70° C. Steam mode 70° C. core probe 50° C. Cooling mode 60° C. Steam mode 60° C. core probe 55° C. | | Combined mode 180° C. core probe 40° C. | |
| Initial weight: | Weight loss | Initial weight: | Weight loss |
| A: 2.612 kg | 16.3% | A: 2.722 kg | 24.7% |
| B: 2.456 kg | 17.2% | B: 2.372 kg | 30.8% |
| C: 1.126 kg | 20% | C: 1.152 kg | 36.7% |
| Cooking time: 1 h 51 min Core temperature stabilization required at: | | Cooking time: 1 h 15 min Core temperature stabilization required at: | |
| 55.9° C.-duration: 2 h 04 min Inertia: 0.8° C. | | 57.9° C.-duration: 1 h 53 min Inertia: 17.9° C. | |

If cooking with a smaller number of phases is required, there can be used for joints of beef a browning phase at 210° C. in dry air for 15 minutes, followed by cooling and a core cooking phase in an atmosphere saturated with steam at 60° C., until a core temperature equal to 52° C. is reached. Of course, the oven in accordance with the invention is suitable for cooking all types of foods and up to around 100 cooking programs can be provided for different types of meat, vegetables, bread and pastries, complete dishes, defrosting, etc.

The computer 8 of the oven 1 can use PID regulation with a weak integral term and a strong derivative term for precise regulation. Proportional power control bands are provided as a function of the three available powers: $P_{max}/3$, $2P_{max}/3$ and $P_{max}$.

If $T_e < T_c - BP1$, then $P = P_{max}$.
If $T_c - BP2 > T_e \geq T_c - BP1$, then $P = 2P_{max}/3$.
If $T_c > T_e \geq T_c - BP2$, then $P = P_{max}/3$.
If $T_e \geq T_c$, then $P = 0$.

The proportional bands BP1 and BP2 depend on the slope p of the curve of the temperature of the interior space. The slope p is calculated continuously from the average of the last five instantaneous slope values calculated. The instantaneous slope is calculated by measuring the time necessary for the temperature to vary by 0.5° C. If the time period is less than 3 seconds for a temperature variation of 0.5° C., the time period is measured for a variation of 1° C. If the time period is less than 3 seconds for a temperature variation of 1° C., the time period is measured for a variation of 2° C. If the time period is less than 3 seconds for a temperature variation of 2° C., the time period is measured for a variation of 4° C.

For example, BP1=p/4+10° C. and BP2=p/4+2° C. If the temperature falls, p=0. To prevent the relays controlling the electrical elements responding too quickly, any change of heating state is prohibited for 3 seconds on switching on and on switching off. In other words, the time between two successive operations of any of the relays controlling the elements is not less than 3 seconds. The temperature $T_e$ of the interior space is compared to the set point temperature $T_c$, to $T_c - BP1$ and to $T_c - BP2$. If after one of these values is crossed the slope p becomes negative, which corresponds to a lack of power from the oven, which is no longer transferring sufficient heat to the product to be cooked, the power level is modified, i.e. the next higher power is used at least until the set point is reached. If after the set point $T_c$ is crossed the temperature exceeds said set point $T_c$ by 1° C., the lower power level is reselected, otherwise the modified power continues.

There is claimed:

1. An oven including:
   an enclosure defining an interior space,
   elements for heating said interior space,
   at least one cooling set for cooling said interior space,
   a programmable control unit, wherein
   said heating elements and said cooling set being connected to the control unit and said control unit being adapted to control said heating elements and said cooling set, said control unit being programmable for maintaining the interior space at a particular first temperature for a first cooking phase, and to effect forced cooling of the interior space by said cooling set from the particular first temperature to a particular second temperature lower than said first temperature, and for maintaining the interior space at the particular second temperature for a second cooling phase, wherein said cooling set includes means for injecting water, and wherein said means for injecting water and said heating means are disposed so that said heating means receive water when said means for injecting water are active.

2. An oven including:
an enclosure defining an interior space,
elements for heating said interior space,
at least one cooling set for cooling said interior space including means for introducing cold air in said interior space and means for injecting water, and
a programmable control unit,
wherein said heating elements and said cooling set are connected to the control unit and said control unit is adapted to control said heating elements and said cooling set, and
wherein said control unit is programmable for maintaining the interior space at a particular first temperature for a first cooking phase, and to effect forced cooling of the interior space by said cooling set from the particular first temperature to a particular second temperature lower than said first temperature, and for maintaining the interior space at the particular second temperature for a second cooking phase.

3. The oven as claimed in claim 2, wherein said cooling set includes means for evacuating hot air contained in said interior space.

4. The oven as claimed in claim 2, further comprising an air pump and a valve disposed between said pump and said interior space in the direction of flow of the air pump, closed when the pump is stopped and open when the pump is operating.

5. Method of controlling an oven including the steps of:
maintaining an enclosure defining an interior space at a particular first temperature for a first cooking phase, by means of elements for heating said interior space and at least a cooling set for cooling said interior space, said cooling set including means for introducing cold air into the interior space and means for injecting water, the heating elements and the cooling set being connected and controlled by a programmable control unit,
effecting a programmed forced cooling of the interior space from the particular first temperature to a particular second temperature lower than said first temperature, and
maintaining the interior space at the particular second temperature for a second cooking phase.

6. The method claimed in claim 5, wherein cooling air is drawn in from an environment at a temperature lower than said first temperature.

7. The method claimed in claim 5, wherein ambient air is drawn in, said second temperature being higher the ambient temperature around the oven.

8. The method claimed in claim 5, including a step of forced cooling to a third temperature lower than said second temperature, after maintaining said interior space at said second temperature, and a step of maintaining said third temperature.

9. The method claimed in claim 5, wherein the humidity in said interior space is estimated and controlled.

10. An oven comprising:
an enclosure defining an interior space of the oven;
a plurality of heating elements in said interior space;
at least one cooling set for cooling said interior space, said cooling set including an evacuation device, a fan and a device for injecting a cooling fluid onto the fan; and
a programmable control unit for controlling said plural heating elements and said cooling set.

11. The oven claimed in claim 10, wherein said cooling set includes means for evacuating hot air contained in said interior space.

12. The oven claimed in claim 10, wherein said cooling set includes means for introducing cold air into said interior space.

13. The oven claimed in claim 12, further including an air pump and a valve disposed between said pump and said interior space in the direction of flow of the air, closed when said pump is stopped and open when said pump is operating.

14. The oven claimed in claim 10, wherein said cooling fluid is water.

15. The oven according to claim 10, wherein said control unit is programmable for maintaining the interior space at a first temperature for a first cooking phase, and to effect forced cooling of the interior space by said cooling set from the first temperature to a second temperature lower than said first temperature, and for maintaining the interior space at the second temperature for a second cooking phase.

16. The oven as claimed in claim 10, wherein the device for injecting a cooling fluid injects the cooling fluid onto blades of the fan.

17. The oven as claimed in claim 16, wherein when the fan is rotating, the cooling fluid is sprayed onto the plural heating elements.

18. A method of controlling an oven including the steps of:
heating an interior space of the oven to a first temperature for a first cooking phase using a plurality of heating elements;
opening a closeable evacuation device to evacuate hot air contained in the interior space;
injecting water into the interior space, said opening the evacuation device and injecting the water steps forcibly cool the interior space from the first temperature to a second temperature lower than said first temperature, and
maintaining the interior space at the second temperature for a second cooking phase.

19. The method claimed in claim 18, wherein cooling air is drawn in from an environment at a temperature lower than said first temperature.

20. The method claimed in claim 19, wherein ambient air is drawn in, said second temperature being higher than the ambient temperature around said oven.

21. The method claimed in claim 18, including a step of forced cooling to a third temperature lower than said second temperature, after maintaining said interior space at said second temperature, and a step of maintaining said third temperature.

22. The method claimed in claim 18, wherein the humidity in said interior space is estimated and controlled.

23. The method as claimed in claim 18, wherein the water is injected onto blades of a cooling fan.

* * * * *